United States Patent
Ota et al.

(10) Patent No.: US 6,546,742 B1
(45) Date of Patent: Apr. 15, 2003

(54) DISPLACEMENT CONTROL METHOD AND APPARATUS FOR VARIABLE DISPLACEMENT COMPRESSOR

(75) Inventors: Masaki Ota, Kariya (JP); Ken Suitou, Kariya (JP); Ryo Matsubara, Kariya (JP); Taku Adaniya, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 328 days.

(21) Appl. No.: 09/644,874

(22) Filed: Aug. 23, 2000

(30) Foreign Application Priority Data

Aug. 24, 1999 (JP) .......................... 11-237506

(51) Int. Cl.[7] ................................ F25B 49/02
(52) U.S. Cl. ..................... 62/133; 62/158; 62/228.5
(58) Field of Search ................... 62/133, 158, 229, 62/228.1, 228.3, 228.5, 323.1, 323.4, 157, 231, 243

(56) References Cited

U.S. PATENT DOCUMENTS 5,074,123 A * 12/1991 Iida et al. ................ 62/158 X
5,088,298 A * 2/1992 Fujii ........................ 62/158 X
5,924,296 A   7/1999 Takano et al. .............. 62/133
6,126,405 A * 10/2000 Kawaguchi et al. ... 62/228.5 X
6,230,507 B1 * 5/2001 Ban et al. .............. 62/228.5 X

FOREIGN PATENT DOCUMENTS

| EP | 0 266 208 A | 5/1988 |
| JP | 60-162087 | 8/1985 |
| JP | 63-90421 | 4/1988 |

* cited by examiner

Primary Examiner—Harry B. Tanner
(74) Attorney, Agent, or Firm—Morgan & Finnegan, LLP (57) ABSTRACT

A displacement control device comprises a control valve. The control valve controls the pressure in a crank chamber. The control valve includes a valve body, and an electromagnetic actuator. A power source supplies the current to the actuator. A switch device located between the actuator and the power source. A controller determines a target value of the current supplied to the actuator in accordance with an external condition. When the target value is changed to a new value, the controller controls the switching of the switch device such that the current is intermittently supplied from the power source to the actuator before the current is set to the new target value. This permits the displacement of the compressor to be smoothly and rapidly changed.

19 Claims, 5 Drawing Sheets

DISPLACEMENT CONTROL METHOD AND APPARATUS FOR VARIABLE DISPLACEMENT COMPRESSOR

BACKGROUND OF THE INVENTION

The present invention relates to a variable displacement compressor used for vehicle air conditioner, and more specifically, to a device and a method for controlling the displacement of a compressor.

In a general variable displacement compressor used for vehicle air conditioners, the inclination angle of a swash plate located in a crank chamber changes in accordance with the pressure in the crank chamber. The crank chamber is connected to a suction chamber, through a bleed passage, and to a discharge chamber, through a supply passage. The bleed passage is regulated by a displacement control valve. A controller, which includes a computer, controls the control valve to adjust the flow rate of refrigerant gas that flows to the suction chamber from the crank chamber through the bleed passage. As a result, the flow rate of gas leaving the crank chamber through the bleed passage changes relative to the flow rate of gas that is supplied to the crank chamber from the discharge chamber through the supply passage. The pressure in the crank chamber is adjusted, accordingly.

The control valve includes, for example, a valve body, a pressure sensing mechanism, which operates the valve body in accordance with the pressure in the suction chamber (suction pressure), and an electromagnetic actuator, which applies a force corresponding to the value of electric current supplied from the controller to the valve body. The force applied by the electromagnetic actuator reflects the target suction pressure. The controller adjusts the value of electric current supplied to the electromagnetic actuator to change the target suction pressure.

The controller increases the value of electric current supplied to the electromagnetic actuator to decrease the target suction pressure and decreases the value of electric current supplied to the electromagnetic actuator to increase the target suction pressure. When electric current is not supplied to the electromagnetic actuator, the target suction pressure is maximized.

When the suction pressure exceeds the target suction pressure, the pressure sensing mechanism operates the valve body to increase the opening size of the bleed passage. Therefore, the flow rate of refrigerant gas from the crank chamber to the suction chamber is increased and the pressure in the crank chamber is then lowered. This increases the inclination angle of the swash plate so that displacement of the compressor increases. When the displacement of the compressor increases, the cooling performance of a refrigeration circuit incorporating the compressor increases, and the suction pressure decreases toward the target suction pressure. When the suction pressure is lower than the target suction pressure, the pressure sensing mechanism operates the valve body to decrease the opening size of the bleed passage.

Therefore, the flow rate of refrigerant gas from the crank chamber to the suction chamber decreases and the pressure in the crank chamber increases. This decreases the inclination angle of the swash plate so that the displacement of the compressor decreases. When the displacement of the compressor decreases, the cooling performance of the refrigeration circuit is reduced and the suction pressure increases toward the target suction pressure.

Thus, the pressure sensing mechanism operates the valve body in accordance with the suction pressure to maintain the suction pressure at the target suction pressure.

The load on a vehicle engine increases when the vehicle is abruptly accelerated. Since the compressor is driven by the vehicle engine, if the engine load is great, the displacement of the compressor is temporarily minimized to reduce the engine load through a displacement limiting control procedure. Specifically, when a vehicle is abruptly accelerated, a controller changes the value of current supplied to the electromagnetic actuator to zero from a value that corresponds to the required cooling performance. As a result, the target suction pressure is maximized. Then, the pressure sensing mechanism of the displacement control valve closes the bleed passage with the valve body such that the actual suction pressure Psa approaches the maximum value. Thus, the pressure in the crank chamber increases and the inclination angle of the swash plate becomes minimum, which minimizes the displacement of the compressor. Therefore, the torque of the compressor is minimized and the engine load is reduced.

The displacement limiting control procedure is completed after a predetermined period from its start. After that, the controller starts a normal displacement control procedure in accordance with the cooling performance required for the refrigeration circuit. Specifically, the controller increases the value of current supplied to the electromagnetic actuator from zero to a value that corresponds to the required cooling performance. Accordingly, the target suction pressure is lowered from the maximum value to a value that corresponds to the required cooling performance.

If the target suction pressure is quickly maximized from a value that corresponds to the required cooling load when the displacement limiting control procedure is initiated, the actual suction pressure is temporarily much lower than the target suction pressure. The pressure sensing mechanism quickly shuts the bleed passage so that the actual suction pressure approaches the maximized target suction pressure. This suddenly increases the crank pressure and decreases the compressor displacement. As a result, the compressor torque is suddenly reduced, which suddenly reduces the engine load.

If the target suction pressure is quickly lowered from the maximum value to a value that corresponds to the required cooling performance when the displacement limiting control procedure is finished, the actual suction pressure is temporarily much higher than the target suction pressure. In this state, the pressure sensing mechanism quickly opens the bleed passage so that the actual suction pressure is lowered to the target suction pressure. This suddenly lowers the crank pressure and increases the compressor displacement. As a result, the compressor torque and the engine load are suddenly increased.

Sudden changes of the compressor displacement caused by sudden changes of the target suction pressure suddenly change the engine load. Accordingly, the vehicle performance and response are adversely affected.

SUMMARY OF THE INVENTION

Accordingly, it is an objective of the present invention to provide a displacement control device and a displacement control method for a variable displacement compressor that smoothly and rapidly shifts between a displacement limiting control procedure to a normal displacement control procedure.

To attain the above-mentioned object, the present invention provides a displacement control device for a variable displacement compressor used in a vehicle air conditioner. The compressor is driven by an engine and varies the displacement in accordance with the pressure in a crank chamber. The control device comprises a control valve for controlling the pressure in the crank chamber. The control valve includes a valve body and an electromagnetic actuator for applying a force to the valve body. The magnitude of the force corresponds to a value of a current supplied to the actuator. A power source supplies the current to the actuator. A switch device is located between the actuator and the power source. A controller determines a target value of the current supplied to the actuator in accordance with an external condition, wherein, when the target value is changed to a new value, the controller controls the switching of the switch device such that the current is intermittently supplied from the power source to the actuator before the current is set to the new target value.

The present invention also provides a method for controlling a displacement control device of a variable displacement compressor used in a vehicle air conditioner. The compressor is driven by an engine and changes the displacement in accordance with the pressure in a crank chamber. The method comprises controlling the pressure in the crank chamber with a control valve, wherein the control valve includes a valve body, an electromagnetic actuator for applying a force to the valve body, wherein the magnitude of the force corresponds to the value of current supplied to the actuator, and determining the target value of current supplied to the actuator in accordance with an external condition, and supplying the current to the actuator, and intermittently supplying the current to the actuator when the target value is changed before the current is adjusted to the new target value.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

One embodiment according to the present invention will be described with reference to FIG. 1 to FIG. 5(f).

Figure 1:
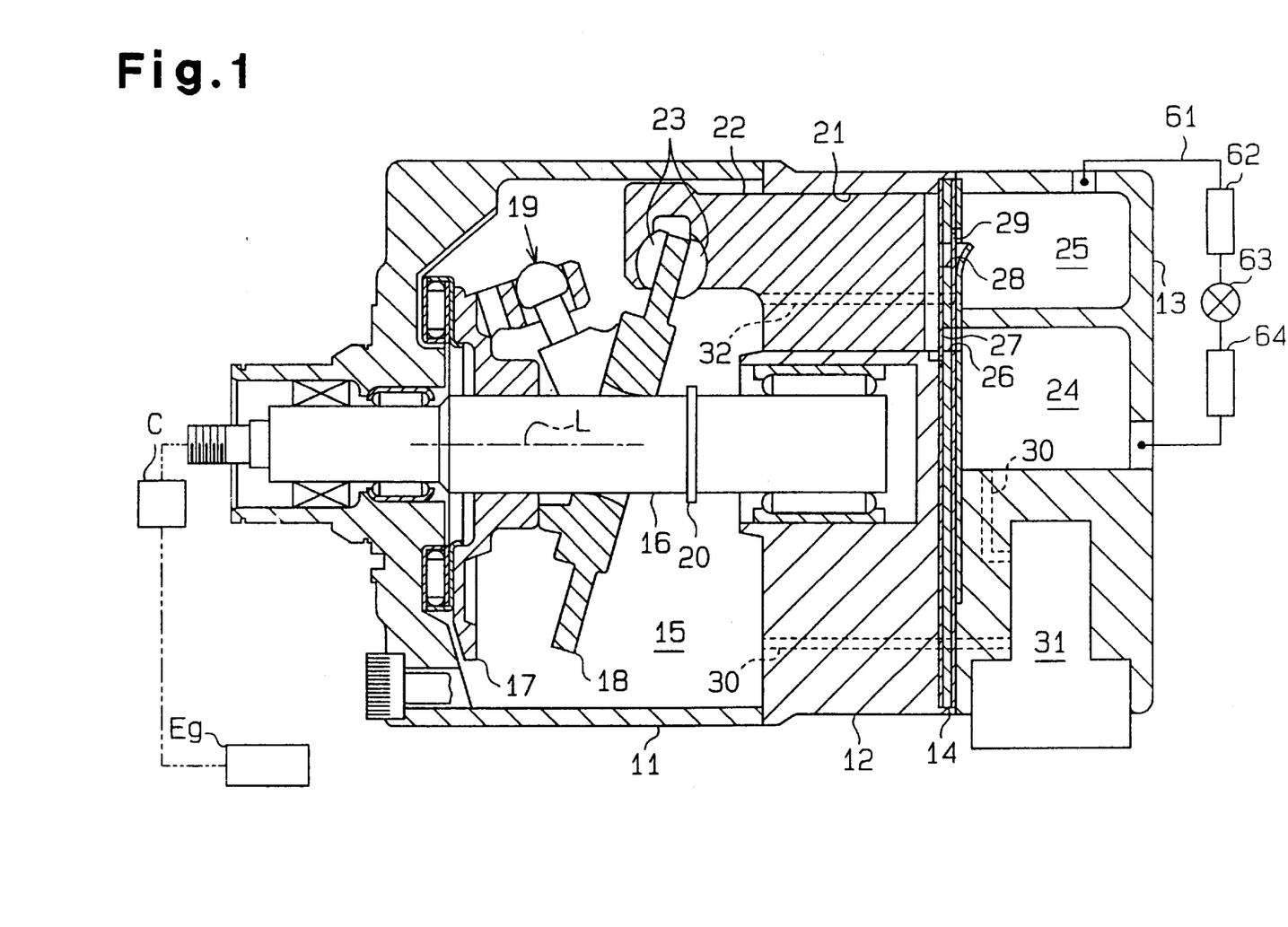
FIG. 1 is a cross-sectional view of a variable displacement compressor in one of the embodiments of the present invention.

As shown in FIG. 1, a front housing member 11 is coupled to the front end face of a cylinder block 12. A rear housing member 13 is coupled to the rear end face of the cylinder block 12 through a valve plate 14. A control pressure chamber, which is a crank chamber 15 in this embodiment, is defined by the front housing member 11 and the cylinder block 12.

A drive shaft 16 is supported by the front housing member 11 and the cylinder block 12 to extend through the crank chamber 15. The drive shaft 16 is connected to an external drive source, which is a vehicle engine Eg in this embodiment, through a clutch mechanism C such as an electromagnetic clutch. The clutch mechanism C selectively transmits the force of the engine Eg to the drive shaft 16.

A rotary support 17 is fixed to the drive shaft 16 in the crank chamber 15. A drive plate, which is a swash plate 18 in this embodiment, is supported on the drive shaft 16. The swash plate 18 slides along and inclines relative to the axis L. A hinge mechanism 19 is located between the rotary support 17 and the swash plate 18. The swash plate 18 is connected to the rotary support 17 through the hinge mechanism 19. The hinge mechanism 19 causes the swash plate 18 to rotate integrally with the rotary support 17. Further, the hinge mechanism 19 guides the sliding and the inclination of the swash plate 18 with respect to the drive shaft 16.

Figure 3:
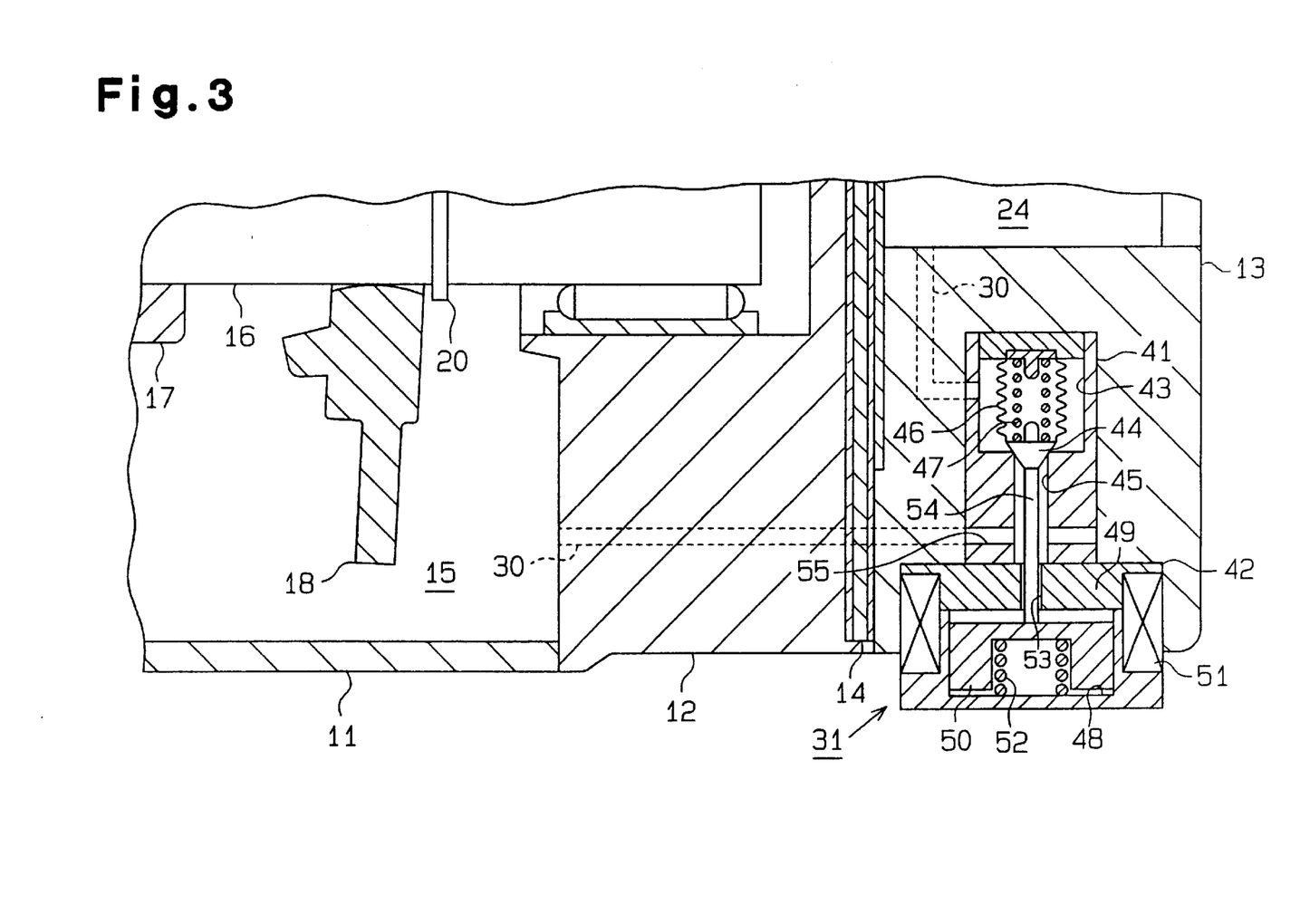
FIG. 3 is a partially enlarged cross-sectional view showing the compressor of FIG. 1 when it is being operated in the minimum displacement.

As the center portion of the swash plate 18 is moved toward the rotary support 17, the inclination angle of the swash plate 18 increases. On the other hand, as the center portion of the swash plate 18 is moved toward the cylinder block 12, the inclination angle of the swash plate 18 decreases. A limit ring 20 is mounted on the drive shaft 16 between the swash plate 18 and the cylinder block 12. As shown in FIG. 1, when the swash plate 18 contacts the rotary support 17, the inclination angle of the swash plate 18 is maximized. As shown in FIG. 3, when the swash plate 18 contacts the limit ring 20 the inclination angle of the swash plate 18 is minimized.

Cylinder bores 21 (only one is shown in FIG. 1) extend through the cylinder block 12 and surround the drive shaft 16. A single-headed piston 22 is accommodated in each cylinder bore 21. Each piston 22 is coupled to the periphery of the swash plate 18 through a pair of shoes 23. The swash plate 18 converts rotation of the drive shaft 16 to reciprocation of each piston 22 in the corresponding cylinder bore 21.

A suction chamber 24, which is a suction pressure zone, and a discharge chamber 25, which is a discharge pressure zone, are formed in the rear housing member 13. A suction port 26, a suction valve flap 27, a discharge port 28 and a discharge valve flap 29 are formed in the valve plate 14 to correspond to each of the cylinder bores 21.

When each piston 22 is moved from the top dead center position to the bottom dead center position, the corresponding suction valve flap 27 permits refrigerant gas to be drawn into the corresponding cylinder bores 21 from the suction chamber 24 through the corresponding suction port 26. When each piston 22 is moved from the bottom dead center position to the top dead center position, the refrigerant gas is compressed to a predetermined pressure in the corresponding cylinder bore 21, and the corresponding discharge valve flap 29 permits the compressed gas to be discharged to the discharge chamber 25 through the corresponding discharge port 28. When the piston 22 compresses the refrigerant gas, high pressure refrigerant gas escapes from the inside of the cylinder bore 21 to the crank chamber 15 through a slight gap between the piston 22 and the cylinder bore 21. Such gas is referred to as blow by gas.

An external refrigerant circuit 61 connects the suction chamber 24 to the discharge chamber 25. The external refrigerant circuit 61 includes a condenser 62, an expansion valve 63 and an evaporator 64. The compressor and the external refrigerant circuit 61 form a vehicle air-conditioner refrigeration circuit.

As shown in FIG. 1, a control passage, which is a bleed passage 30 in this embodiment, connects the crank chamber 15 to the suction chamber 24. A displacement control valve 31 is located in the rear housing member 13 to regulate the bleed passage 30. A supply passage 32 connects the discharge chamber 25 to the crank chamber 15. The high pressure refrigerant gas in the discharge chamber 25 is supplied to the crank chamber 15 through the supply passage 32.

Figure 4:
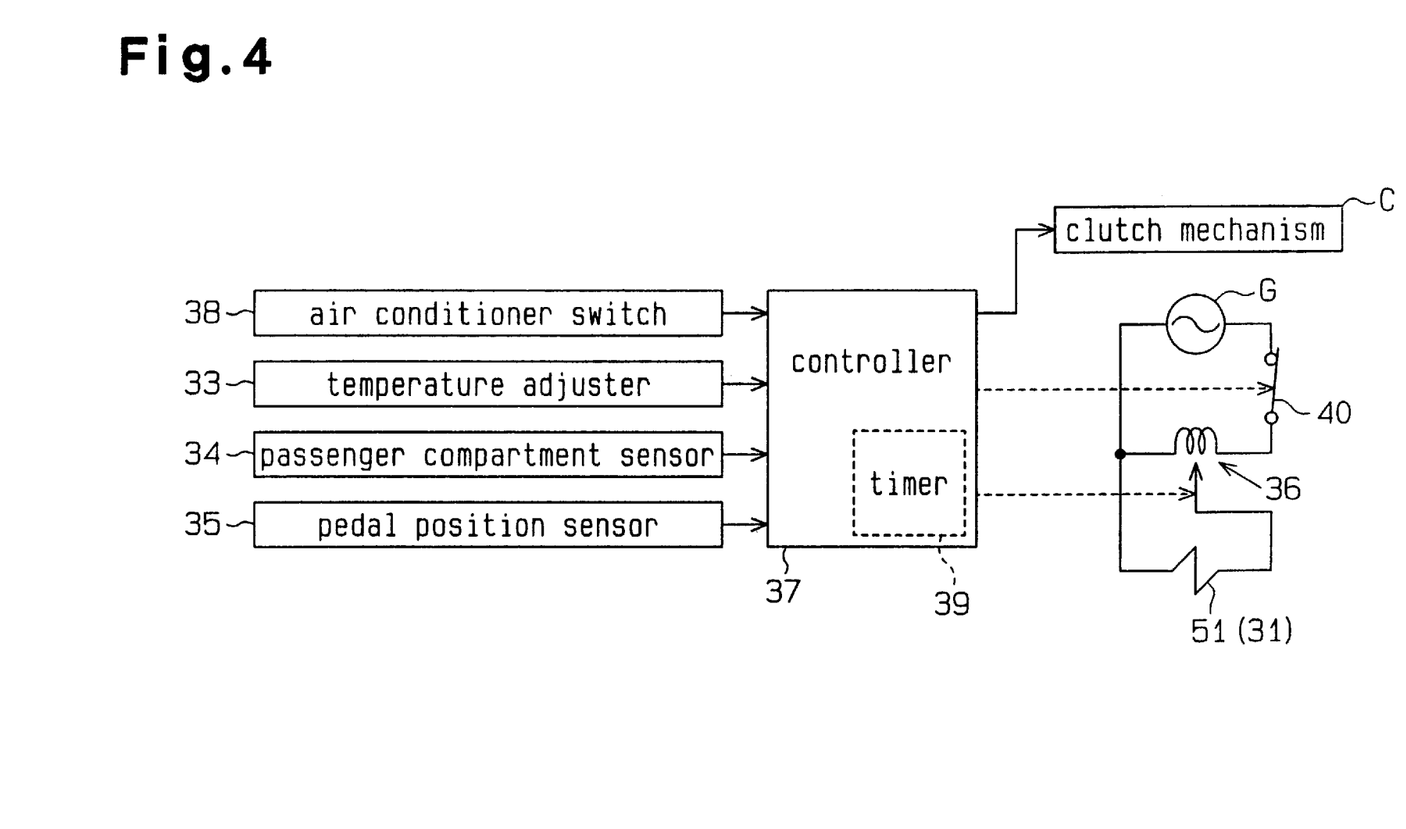
FIG. 4 is a schematic circuit diagram illustrating the control device of the compressor shown in FIG. 1.

As shown in FIG. 4, an air conditioner switch 38 for starting and stopping the vehicle air conditioner, a temperature adjuster 33 for setting a target passenger compartment temperature, a passenger compartment temperature sensor 34, a pedal position sensor 35, the clutch mechanism C and the control valve 31 are connected to a controller 37. The pedal position sensor 35 detects the degree of depression of the vehicle gas pedal, that is, the position of the gas pedal. The degree of pedal depression represents the load on the engine Eg. The controller 37 contains a computer. Further, the controller 37 is connected to the control valve 31 through a drive circuit 36. The drive circuit 36 includes a transformer. The drive circuit 36 changes the supplied electric current to the control valve 31 by changing a voltage applied to the control valve 31. The temperature adjuster 33, the temperature sensor 34 and the pedal position sensor 35 form an external state detecting means or an external state detector.

A switch device 40 is located on a supply line that connects the electric power source G, such as a battery, to the control valve 31. The switch device 40 includes, for example, an electric element or a mechanical switch. The controller 37 controls switching of the switch device 40 to selectively permit electric current to be supplied from the power source G to the control valve 31. The controller 37 also includes a timer 39.

Figure 2:
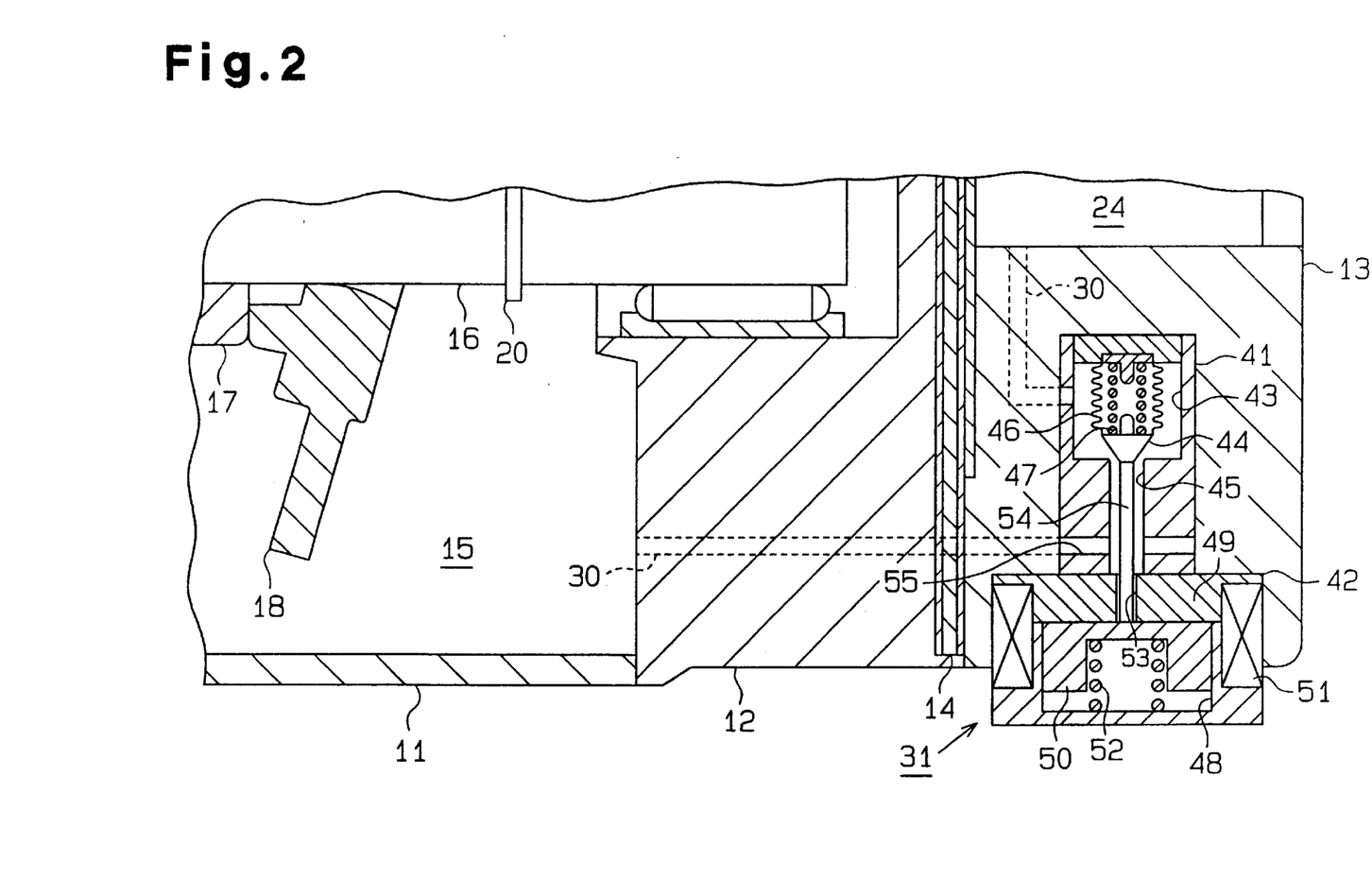
FIG. 2 is a partially enlarged cross-sectional view showing the compressor of FIG. 1 when it is being operated in the maximum displacement.

The control valve 31 will now be described. As shown in FIGS. 2 and 3, the control valve 31 has a valve housing 41 and an electromagnetic actuator, which is solenoid unit 42 in this embodiment. The valve housing 41 and the solenoid unit 42 are coupled to each other. A valve chamber 43, which serves as a pressure sensing chamber, is formed in the valve housing 41. A valve body 44 is located in the valve chamber 43. A valve hole 45 extends axially in the valve housing 41. The valve hole 45 opens in the valve chamber 43 to face the valve body 44. The valve chamber 43 is connected to the suction chamber 24 through a downstream portion of the bleed passage 30.

A pressure sensing member, which is a bellows 46 in this embodiment, is housed in the valve chamber 43. The top end of the bellows 46 is fixed to a corresponding wall of the valve chamber 43, and the lower end of the bellows 46 is connected to the valve body 44. A setting spring 47 is located in the bellows 46. The setting spring 47 sets the initial length of the bellows 46. The valve chamber 43, the bellows 46 and the setting spring 47 form a pressure sensing mechanism.

The solenoid unit 42 in this embodiment has a plunger chamber 48. A fixed core 49 is fitted to the upper opening of the plunger chamber 48. A plunger 50 is housed in the plunger chamber 48. A cylindrical coil 51 is located around the fixed core 49 and the plunger 50. The drive circuit 36 is connected to the coil 51. A follower spring 52 is located between the plunger 50 and the bottom wall of the plunger chamber 48 to urge the plunger 50 toward the fixed core 49.

A guide hole 53 extends through the fixed core 49 and is coaxial with the valve hole 45. A transmission rod 54 extends through the guide hole 53 and the valve hole 45. The proximal end of the transmission rod 54 is fixed to the plunger 50. The follower spring 52 urges the transmission rod 54, through the plunger 50, toward the valve body 44, which causes the distal end of the transmission rod 54 to contact the valve body 44. In other words, the plunger 50 and the valve body 44 are coupled to each other by the transmission rod 54. The valve body 44 is urged in a direction to open the valve hole 45 by the follower spring 52.

A port 55 is formed in the valve housing 41 between the valve chamber 43 and the plunger chamber 48. The valve hole 45 is connected to the crank chamber 15 through the port 55 and the upstream portion of the bleed passage 30. The valve chamber 43, the valve hole 45 and the port 55 form a part of the bleed passage 30.

If the air conditioner switch 38 is turned on and the temperature detected by the temperature sensor 34 is higher than a target temperature set by the temperature adjuster 33 while the engine Eg is running, the controller 37 activates, or engages, the clutch mechanism C, which starts the compressor.

The controller 37 determines the cooling performance required for the refrigeration circuit based on the target temperature set by the temperature adjuster 33 and the temperature detected by the temperature sensor 34. Accordingly, the controller 37 determines the value of current supplied to the coil 51. The controller 37 supplies the current of the determined value to the coil 51 through the drive circuit 36. Then, an electromagnetic force based on the supplied current is generated between the fixed core 49 and the plunger 50. The magnitude of the attraction force represents the target value of the pressure in the suction chamber 24 (target suction pressure). The attraction force urges the valve body 44, through the transmission rod 54, in a direction increasing the opening size of the valve hole 45.

The bellows 46 of the control valve 31 expands and contracts in accordance with the pressure in the valve chamber 43. In other words, the bellows 46 applies a force, the magnitude of which corresponds to the pressure in the valve chamber 43, to the valve body 44. The pressure (suction pressure) in the suction chamber 24 is applied to the valve chamber 43 through the downstream portion of the bleed passage 30. Therefore, the valve chamber 43 is exposed to the suction pressure.

The suction pressure in the valve chamber 43 urges the valve body 44 toward the valve hole 45. The valve body 44 is exposed to the pressure (crank pressure) in the crank chamber 15 through the upstream portion of the bleed passage 30, the port 55 and the valve hole 45. The crank pressure urges the valve body 44 away from the valve hole 45. The crank pressure is higher than the suction pressure. Therefore, the valve body 44 is urged away from the valve hole 45 by a force corresponding to the difference between the crank pressure and the suction pressure.

The forces that act on the valve body 44 determine the position of the valve body 44 with respect to the valve hole 45, that is, the opening size of the valve hole 45.

The higher the passenger compartment temperature is with respect to the target temperature, the greater the cooling performance required for the refrigeration circuit is, and the greater the supplied current value for the coil 51 is, as determined by the controller 37. Accordingly, the attraction force between the fixed core 49 and the plunger 50 becomes stronger, and the force that urges the valve body 44 away from the valve hole 45 increases. Therefore the target suction pressure is lowered. The bellows 46 causes the valve body 44 to adjust the opening size of the valve hole 45 such that the actual suction pressure is directed to the lower target suction pressure. That is, the greater the supplied current value to the coil 51 is, the lower the suction pressure level set by the control valve 31 is. The control valve 31 varies the suction pressure by varying the displacement of the compressor.

If the actual suction pressure is higher than the target suction pressure, the bellows 46 causes the valve body 44 to increase the opening size of the valve hole 45. Then, the flow rate of the refrigerant gas discharged to the suction chamber 24 from the crank chamber 15 through the bleed passage 30 increases, and the pressure in the crank chamber 15 decreases. Thus, the inclination angle of the swash plate 18 increases and the displacement of the compressor increases. The increase in the compressor displacement increases the cooling performance of the refrigeration circuit and decreases the actual suction pressure. Thus, the actual suction pressure seeks the target suction pressure.

When the valve body 44 fully opens the valve hole 45, refrigerant gas is discharged from the crank chamber 15 to the suction chamber 24 at a relatively high flow rate, which significantly decreases the pressure in the crank chamber 15. Accordingly, the inclination angle of the swash plate 18 is maximized and the displacement of the compressor is maximized (see FIG. 2).

The smaller the difference between the passenger compartment temperature and the target temperature is, the smaller the cooling performance required for the refrigeration circuit is, and the smaller the value of the current value supplied to the coil 51 is. Accordingly, the attraction force between the fixed core 49 and the plunger 50 decreases and the force that urges the valve body 44 away from the valve hole 45 decreases. The target suction pressure is therefore increased. The bellows 46 causes the valve body 44 to adjust the opening size of the valve hole 45 so that the actual suction pressure is directed to the higher target suction pressure. That is, the smaller the current value supplied to the coil 51 is, the higher the suction pressure level that is set by the control valve 31 is. The control valve 31 adjusts the suction pressure by adjusting the compressor displacement.

If the actual suction pressure is lower than the target suction pressure, the bellows 46 causes the valve body 44 to decrease the opening size of the valve hole 45. Then, the flow rate of the refrigerant gas discharged to the suction chamber 24 from the crank chamber 15 through the bleed passage 30 decreases, and the pressure in the crank chamber 15 increases. Thus, the inclination angle of the swash plate 18 is decreased and the displacement of the compressor is decreased. The decrease in the compressor displacement decreases the cooling performance of the refrigeration circuit and increases the actual suction pressure. Thus, the actual suction pressure seeks the target suction pressure.

When the valve body 44 fully closes the valve hole 45, no refrigerant gas is discharged from the crank chamber 15 to the suction chamber 24, which significantly increases the pressure in the crank chamber 15. Accordingly, the inclination angle of the swash plate 18 is minimized and the displacement of the compressor is minimized (see FIG. 3).

When the air conditioner switch 38 is turned off or when the temperature detected by the passenger compartment temperature sensor 34 becomes lower than the target temperature set by the temperature adjuster 33, the clutch mechanism C is disengaged, which stops the compressor.

As described above, the displacement of the compressor is usually adjusted according to the cooling performance required for the refrigeration circuit. However, when the load on the engine Eg abruptly increases during rapid acceleration of the vehicle, a displacement limiting control procedure for reducing the engine load is performed. The displacement limiting control procedure temporarily minimizes the displacement of the compressor.

To reduce the engine load during rapid acceleration, a clutch mechanism C may be disengaged to temporarily disconnect the compressor from the engine Eg. However, to ensure the minimum cooling performance even during rapid acceleration of the vehicle and to avoid the shock that accompanies engagement and disengagement of the clutch mechanism C, temporary disengagement of the clutch mechanism C is not favored.

When the pedal position detected by the pedal position sensor 35 exceeds a predetermined value, the controller 37 determines that the vehicle will quickly accelerate. In this case, the controller 37 initiates the displacement limiting control procedure. That is, the controller 37 commands the drive circuit 36 to lower the value Ix of current supplied to the coil 51 to zero from a value that corresponds to the desired cooling performance.

Accordingly, the target suction pressure increases from a value P1 that corresponds to the required cooling performance to the maximum value. As a result, the bellows 46 moves the valve body 44 to close the valve hole 45 so that the actual suction pressure approaches the maximized target suction pressure. Therefore, the crank pressure increases, which minimizes the compressor displacement. Accordingly, the compressor torque is minimized, which reduces the load on the engine Eg. The reduced engine load permits the engine Eg to quickly accelerate the vehicle.

The controller 37 terminates the displacement limiting control procedure, when the timer 39 detects that a predetermined period has elapsed, and switches to the normal control procedure, which is based on the required cooling performance. That is, the controller 37 increases the value of current supplied to the coil 51 from zero to a value that corresponds to the required cooling performance. Accordingly, the target suction pressure is lowered from the maximum value to a value that corresponds to the required cooling performance.

When the air conditioner switch 38 is on, the controller 37 controls the switching of the switch device 40 when the target value TE of current supplied to the coil 51 is changed. The controller 37 also controls the switching of the device 40 when the target current value TE is changed at the beginning and the end of the displacement limiting control procedure.

Figures 5A, 5B:
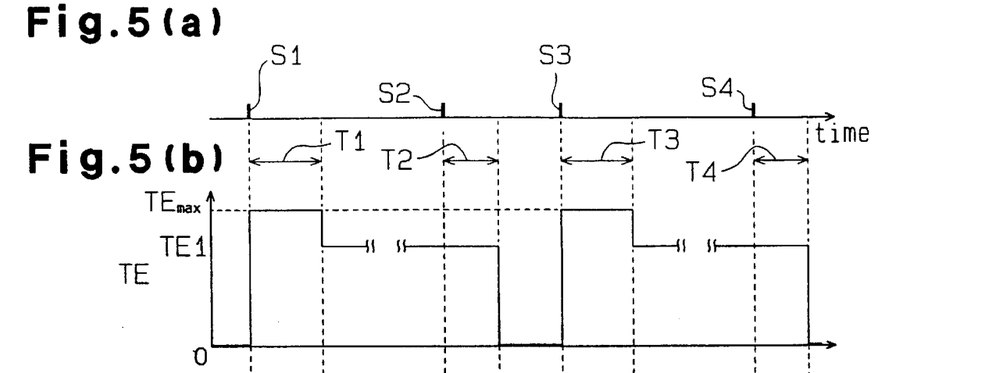
FIGS. 5(a) to 5(f) are time charts showing operations of the compressor shown in FIG. 1 and the control device shown in FIG. 4.

When the air conditioner switch 38 is turned on, the controller 37 regards the turning on of the switch 38 as a change command S1 shown in FIG. 5(a). As shown in FIG. 5(b), the controller 37 determines a required target value TE1 of the target current value TE based on the temperature detected by the temperature sensor 34 and the target temperature set by the temperature adjuster 33 (In this state, the detected temperature is equal to or higher than the target temperature). The controller 37 maintains the target current value TE at the maximum value TEmax until a first predetermined period T1 elapses after the command S1. After the first predetermined period T1, the controller 37 commands the drive circuit 36 to change the target current value TE to the required value TE1.

Figure 5C:
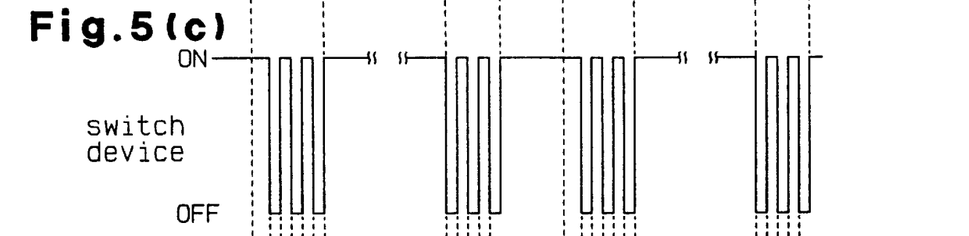

As shown in FIG. 5(c), the controller 37 starts controlling the switching of the switch device 40 in response to the command S1. Specifically, the controller 37 causes the device 40 to turn on and off such that the current is intermittently supplied from the power source G to the coil 51. As shown in FIG. 5(b), the target current value TE is maintained at the maximum value TEmax over the first predetermined period T1. During the first predetermined period T1, the actual current value AE to the coil 51 is the maximum value AEmax when the device 40 is turned on, and is zero when the device 40 is turned off. As a result, as shown in FIG. 5(e), the target suction pressure Pst is switched between the maximum value and the minimum value. Thus, the actual suction pressure is switched between values that are significantly higher than the target suction pressure Pst (when the device 40 is on) and values that are significantly lower than the target suction value Pst (when the device 40 is off) within a short time.

As shown in FIGS. 5(b) and 5(c), the controller 37 changes the target current value TE from the maximum value TEmax to the value TE1, which corresponds to the required cooling performance. Also, the controller 37 stops rapidly switching of the device 40 when the first predetermined period T1 elapses after setting the device 40 to the on state.

Figure 5D:
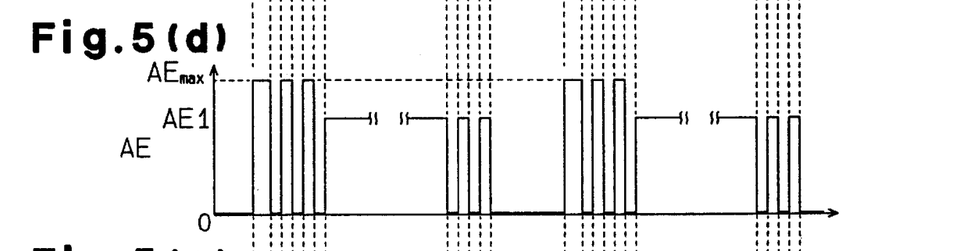
Figure 5E:
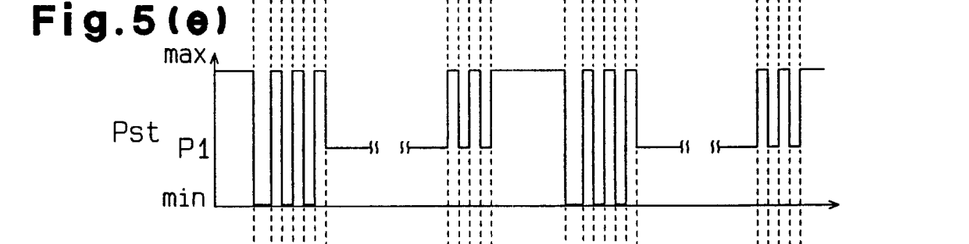
Figure 5F:
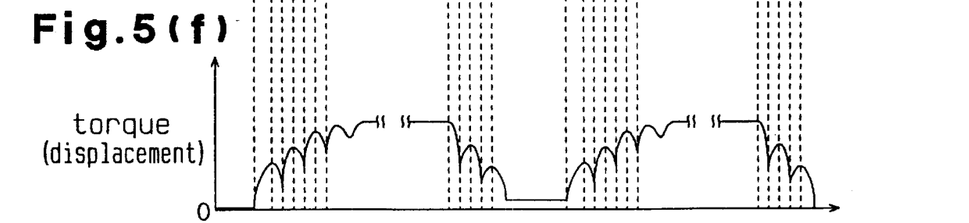

FIG. 5(f) illustrates the changes of the compressor displacement. When the actual suction pressure is significantly higher than the target suction pressure Pst, the bellows 46 causes the valve body 44 to fully open the valve hole 45, which quickly increases the compressor displacement. When the actual suction pressure is significantly lower than the target suction pressure Pst, the bellows 46 causes the valve body 44 to close the valve hole 45, which quickly decreases the compressor displacement. The duration of each on time and off time is sufficiently long such that the compressor displacement starts changing. When the displacement limiting control procedure is started or finished, the duration of the on time and off time of the device 40 is determined in the same manner. Also, when the air conditioner switch 38 is turned off, the duration of the on time and the off time of the device 40 is determined in the same manner.

When the actual supplied current value AE is first maximized after the command S1, as shown in FIG. 5(d), the compressor displacement is quickly increased from the minimum value. Then, the device 40 is turned off, which quickly decreases the compressor displacement. However, the device 40 is turned on before the compressor displacement is minimized. Accordingly, the compressor displacement is greater than when actual current value AE is first maximized. The repetition of turning the device 40 on and off gradually moves the fluctuation range of the compressor displacement away from the minimum value. That is, although the displacement repeats small increases and decreases, the average value of the displacement increased. As a result, the load on the engine Eg is not suddenly increased when the switch 38 is turned on, which improves the performance of the vehicle.

When the depression degree detected by the pedal position sensor 35 reaches a predetermined value, the controller 37 initiates the displacement limiting control procedure. The controller 37 regards the starting of the procedure as a change command S2 shown in FIG. 5(a) to change the target current value TE. The controller 37 changes the target current value TE from the value TE1 to zero as shown in FIG. 5(b) when a second predetermined period T2 elapsed after the signal S2. Specifically, the controller 37 changes the target current value TE to zero after the second predetermined period T2, which starts after the signal S2. The controller 37 commands the drive circuit 36 to maintain the target value TE at a value that is greater than zero, that is, at the required value TE1, which corresponds to the required cooling performance, during the second predetermine period T2.

As shown in FIG. 5(c), the controller 37 rapidly switches the device 40 during the second predetermined period T2 in response to the command S2. During the second predetermined period T2, the target current value TE is maintained to the value TE1, which corresponds to the required cooling performance as shown in FIG. 5(b). The actual value AE of the current supplied to the coil 51 is changed to the value AE1, which corresponds to the required cooling performance, when the device 40 is on. The value AE is changed to zero when the device 40 is off. That is, the value AE is alternately changed between the value AE1 and zero. As a result, the target suction pressure Pst is alternately changed between a value P1, which corresponds to the required cooling performance, and the maximum value. Thus, the actual suction pressure is switched between values that are significantly higher than the target suction pressure Pst (when the device 40 is on) and values that are significantly lower than the target suction value Pst (when the device 40 is off).

After the timer 39 detects that the predetermined period has elapsed after the command S2, the controller 37 changes the target current value TE from the value TE1, which corresponds to the required cooling performance, to zero. Then, the controller 37 stops controlling the switching of the device 40.

When the controller 37 initiates the displacement limiting control procedure, the compressor displacement acts as shown in FIG. 5(f). When the device 40 is first turned off after the command S2, the compressor displacement is quickly decreased. When the device 40 is subsequently turned on, the compressor displacement is quickly increased. However, when the device 40 is subsequently turned off again, the compressor displacement does not decrease to the displacement that existed when the displacement limiting control procedure was initiated. That is, the compressor displacement is decreased to a smaller displacement than the displacement that existed when the device 40 is first turned off after the command S2.

The repetition of turning the device 40 on and off gradually moves the fluctuation range of the compressor displacement toward the minimum value. That is, although the displacement repeats small increases and decreases, the average value of the displacement is decreased. As a result, the load on the engine Eg is gradually decreased when the displacement limiting control procedure is started (immediately after the command S2), which improves the performance of the vehicle.

When the timer 39 detects that the predetermined period as elapsed from the command S2, the controller 37 finishes the displacement limiting control procedure. The controller 37 regards the end of the procedure as a change command S3 to change the target current value TE to the coil 51. In response to the command S3, the controller 37 commands the drive circuit 36 to change the target current value TE to the value TE1, which corresponds to the required cooling performance. Specifically, the controller 37 changes the target current value TE to the required value TE1 when a third predetermined period T3 has elapsed after the command S3. The controller 37 commands the drive circuit 36 to maintain the target current value TE at the maximum value TEmax until the value TE is changed to the value TE1.

As shown in FIG. 5(c), the controller 37 starts controlling the switching of the device 40 in response to the command S3. The controller 37 stops switching the device 40 when the predetermined period T3 has elapsed from the command S3. The controller 37 changes the target current value TE from the maximum value TEmax to the required value TE1, which corresponds to the required cooling performance. The device 40 is on when the controller 37 finishes rapidly switching the device 40.

As described above, near the end of the displacement limiting control procedure (during the third period T3), the controller 37 causes the compressor displacement to behave in the same manner as when the air conditioner switch 38 is turned on (see the first period T1. Thus, the displacement limiting control procedure gradually changes the load on the engine Eg, which improves the performance of the vehicle.

When the air conditioner switch 38 is turned off, the controller 37 judges this as a command S4 to change the current value TE to the coil 51. As shown in FIG. 5(b), the controller 37 commands the drive circuit 36 to change the target current value TE from the value TE1, which corresponds to the required cooling performance, to zero. The controller 37 also commands the drive circuit 36 to maintain the target current value TE at the value TE1 until the actual current value AE to the coil 51 is changed to zero. After the command S4, the controller 37 does not disengage the clutch mechanism C until the controller 37 commands the drive circuit 36 to decrease the target current value TE to zero.

As shown in FIG. 5(c), the controller 37 starts controlling the switching of the device 40 in response to the command S4. Specifically, the controller 37 changes the actual current value AE to zero when the timer 39 detects that a fourth predetermined period T4 has elapsed after the command S4. Then, the controller 37 stops rapidly switching the device 40 and disengages the clutch mechanism C to stop driving the compressor.

The embodiment of FIGS. 1 to 5 has the following advantages.

(1) The controller 37 controls the switching of the device 40 when the air conditioner switch 38 is turned on and off and when the displacement limiting control procedure is started and finished. Therefore, a complicated control procedure for gradually changing the target current value TE is not required. Also, the compressor displacement is gradually changed, which improves the performance of the vehicle.

(2) The controller 37 maintains the target current value TE at the maximum value TEmax, which is higher than the required value TE1, until a predetermined period has elapsed after the commands S1, S3. Therefore, when the device 40 is on, the actual suction pressure is significantly higher than the target suction pressure Pst, and the bellows 46 causes the valve body 44 to open the valve hole 45. When the device 40 is off, the actual suction pressure is significantly lower than the target suction pressure Pst, and the bellows 46 causes the valve body 44 to close the valve hole 45. That is, the compressor displacement is greatly changed by turning the device 40 on and off only once, which improves the performance of the vehicle. This also improves the cooling performance of the refrigerant circuit. That is, the compressor displacement is quickly increased to change the compartment temperature to a required value.

The invention may be embodied in the following forms.

In a normal displacement control procedure, the switching of the device 40 need not be controlled. In this case, the switching of the device 40 may be controlled when the amount of change of the supplied current value AE is greater than a predetermined value, that is, when the compressor displacement is greatly changed.

The present invention may be applied to a displacement control valve in which the target suction pressure Pst is increased when the supplied current value AE to the coil 51 is increased and the target suction pressure Pst is decreased when the current value AE is decreased.

The present invention may be applied to a control device of a variable displacement compressor having a displacement control valve that only adjusts the opening size of the supply passage 32.

The present invention may be applied to the control device of a variable displacement compressor having a displacement control valve that adjusts the opening size of both the bleed passage 30 and the supply passage 32.

The command S2, which is generated when the displacement limiting control procedure is started, may be generated when the change of pedal position detected by the pedal position sensor 35 reaches a predetermined amount per unit time.

The pressure sensing mechanism may include a diaphragm.

The valve body 44 may be actuated only by the solenoid unit 42, which is an electromagnetic actuator.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A displacement control device for a variable displacement compressor used in a vehicle air conditioner, wherein the compressor is driven by an engine and varies the displacement in accordance with the pressure in a crank chamber, the control device comprising:

a control valve for controlling the pressure in the crank chamber, the control valve including:
a valve body; and
an electromagnetic actuator for applying a force to the valve body, wherein the magnitude of the force corresponds to a value of a current supplied to the actuator;

a power source for supplying the current to the actuator;

a switch device located between the actuator and the power source; and a controller for determining a target value of the current supplied to the actuator in accordance with an external condition, wherein, when the target value is changed to a new value, the controller controls the switching of the switch device such that the current is intermittently supplied from the power source to the actuator before the current is set to the new target value.

2. The control device according to claim 1, wherein the controller sets the value of the current from the power source to the actuator to be greater than zero when controlling the switching of the switch device.

3. The control device according to claim 2, wherein, when the new target value is greater than a current target value, the controller sets the value of the current supplied to the actuator to be greater than the new target value when controlling the switching of the switch device.

4. The control device according to claim 1, wherein the control device further includes an air conditioning switch to start and stop the vehicle air conditioner, wherein the controller changes the target value when the air conditioning switch is operated.

5. The control device according to claim 1, wherein the control device further includes a detector for detecting the external condition.

6. The control device according to claim 1, wherein the controller has a pedal position sensor to detect the degree of depression of an acceleration pedal of the vehicle, wherein the controller changes the target value in accordance with the detected pedal position.

7. The control device according to claim 6, wherein, when the pedal position exceeds a predetermined value, the controller temporarily sets the target value to minimize the compressor displacement.

8. The control device according to claim 6, wherein, when an engine load exceeds a predetermined value, the controller temporarily sets the target value to minimize the compressor displacement.

9. The control device according to claim 6, wherein, when the new target value differs from a current target value, the controller starts controlling the switching of the switch device and starts measuring time with a timer, wherein, when the measured time reaches a predetermined value, the controller stops controlling the switching of the switch device and causes a current that corresponds to the new target value to be supplied from the power source to the electromagnetic actuator.

10. A displacement control device for a variable displacement compressor used in a vehicle air conditioner, wherein the compressor is driven by an engine and varies the displacement in accordance with the pressure in a crank chamber, the control device comprising:
   a control valve for controlling the pressure in the crank chamber, the control valve including:
      a valve body; and
      an electromagnetic actuator for applying a force to the valve body, wherein the magnitude of the force corresponds to a value of a current supplied to the actuator;
   a power source for supplying the current to the actuator;
   a drive circuit for adjusting the current supplied to the actuator;
   a switch device located between the actuator and the power source; and
   a controller for setting a target value of the current supplied to the actuator in accordance with an external condition, wherein, when the target value is changed and a predetermined time elapses, the controller instructs the drive circuit to supply current to the actuator in accordance with the new target value and controls the switching of the switch device such that the current is intermittently supplied from the power source to the actuator before setting the current to the new target value during the predetermined time.

11. The control device according to claim 10, wherein the controller sets the value of the current from the power source to the actuator to be greater than zero when controlling the switching of the switch device.

12. The control device according to claim 11, wherein, when the new target value is greater than a current target value, the controller sets the value of the current supplied to the actuator to be greater than the new target value when controlling the switching of the switch device.

13. The control device according to claim 10, wherein the control device further includes an air conditioning switch to start and stop the vehicle air conditioner, wherein the controller changes the target value when the air conditioning switch is operated.

14. The control device according to claim 10, wherein the control device further includes a detector for detecting the external condition.

15. The control device according to claim 10, wherein the controller has a pedal position sensor to detect the degree of depression of an acceleration pedal of the vehicle, wherein the controller changes the target value in accordance with the detected pedal position.

16. The control device according to claim 15, wherein, when the pedal position exceeds a predetermined value, the controller temporarily sets the target value to minimize the compressor displacement.

17. The control device according to claim 15, wherein, when an engine load exceeds a predetermined value, the controller temporarily sets the target value to minimize the compressor displacement.

18. The control device according to claim 15, wherein, when the new target value differs from a current target value, the controller starts controlling the switching of the switch device and starts measuring time with a timer, wherein, when the measured time reaches a predetermined value, the controller stops controlling the switching of the switch device and causes a current that corresponds to the new target value to be supplied from the power source to the electromagnetic actuator.

19. A method for controlling a displacement control device of a variable displacement compressor used in a vehicle air conditioner, wherein the compressor is driven by an engine and changes the displacement in accordance with the pressure in a crank chamber, the method comprising:
   controlling the pressure in the crank chamber with a control valve, wherein the control valve includes a valve body, an electromagnetic actuator for applying a force to the valve body, wherein the magnitude of the force corresponds to the value of current supplied to the actuator;
   determining the target value of current supplied to the actuator in accordance with an external condition;
   supplying the current to the actuator; and
   intermittently supplying the current to the actuator when the target value is changed before the current is adjusted to the new target value.

* * * * *